United States Patent
Cha et al.

(10) Patent No.: US 11,431,832 B2
(45) Date of Patent: Aug. 30, 2022

(54) MOBILE TERMINAL

(71) Applicant: LG ELECTRONICS INC., Seoul (KR)

(72) Inventors: Youngdo Cha, Seoul (KR); Sunglyong Cha, Seoul (KR); Sarah Kim, Seoul (KR); Minbok Lee, Seoul (KR); Dongwon Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/051,622

(22) PCT Filed: May 3, 2018

(86) PCT No.: PCT/KR2018/005144
§ 371 (c)(1),
(2) Date: Oct. 29, 2020

(87) PCT Pub. No.: WO2019/212074
PCT Pub. Date: Nov. 7, 2019

(65) Prior Publication Data
US 2021/0243290 A1    Aug. 5, 2021

(51) Int. Cl.
*H04M 1/02*    (2006.01)

(52) U.S. Cl.
CPC ................. *H04M 1/0266* (2013.01)

(58) Field of Classification Search
CPC .................................................. H04M 1/0266
See application file for complete search history.

(56) References Cited

U.S. PATENT DOCUMENTS

| 2013/0208510 | A1* | 8/2013 | Takashima | G09F 13/04 |
| | | | | 362/615 |
| 2015/0222735 | A1 | 8/2015 | Tanaka | |
| 2015/0241621 | A1* | 8/2015 | Inui | G02F 1/133615 |
| | | | | 349/65 |
| 2017/0215290 | A1* | 7/2017 | Bathiche | G06F 1/1601 |
| 2017/0357123 | A1* | 12/2017 | Zhu | G02F 1/133528 |

(Continued)

FOREIGN PATENT DOCUMENTS

| JP | 2004-334048 A | 11/2004 |
| JP | 2013-105935 A | 5/2013 |
| JP | 2014-67916 A | 4/2014 |

(Continued)

*Primary Examiner* — Ernest G Tacsik
(74) *Attorney, Agent, or Firm* — Birch, Stewart, Kolasch & Birch, LLP (57) ABSTRACT

In order to minimize an increase in a bezel of a mobile terminal, provided is a mobile terminal comprising: a display panel; a window coupled to the front surface of the display panel so as to cover the front surface of the display panel; and a seating frame in which the display panel is mounted, wherein the seating frame comprises: a panel seating portion in which at least one region of the display panel is seated; a window seating portion which receives an edge region of the rear surface of the window and forms a large separation space from the rear surface of the window inward; and a sidewall portion forming a sidewall connecting the window seating portion and the panel seating portion, wherein the sidewall portion is recessed outward in a region corresponding to a side portion of the display panel.

8 Claims, 5 Drawing Sheets

(56) References Cited

U.S. PATENT DOCUMENTS

2018/0157291 A1* 6/2018 Raff .................. G06F 1/1637
2018/0205809 A1* 7/2018 Luo .................. H04M 1/0266

FOREIGN PATENT DOCUMENTS

| KR | 10-0863798 B1 | 10/2008 |
| KR | 10-2016-0120897 A | 10/2016 |
| KR | 10-2017-0070667 A | 6/2017 |

\* cited by examiner

MOBILE TERMINAL

CROSS REFERENCE TO RELATED APPLICATIONS

This application is the National Phase of PCT/KR2018/005144 filed on May 3, 2018, which is hereby expressly incorporated by reference into the present application.

TECHNICAL FIELD

The present disclosure relates to a mobile terminal for implementing minimization of a bezel.

BACKGROUND ART

In a mobile terminal, demands for maximizing the size of a screen of the mobile terminal compared to the size of the front area of the mobile terminal have continued. This means minimization of a bezel.

The bezel refers to an area from the boundary of a non-output area of a display unit to the boundary of one side of the front area of the mobile terminal.

The bezel may be present due to structural constraints on circuitry of the display unit or on a backlight unit.

The display unit is fixedly seated on a front case or a middle case of the mobile terminal. To seat, fix, and waterproof the display, a minimum area needs to be secured and the bezel is generated in this process of securing the minimum area.

More specifically, a window of the display unit is seated in a seating area of the case. The seating area is provided with a bonding/waterproofing member for fixing the window and the case or waterproofing a gap between the window and the case.

The bonding/waterproofing member should be provided with a width greater than a certain width to exhibit performance thereof.

In addition, a groove is formed on one side of the seating area to prevent the bonding/waterproofing member from overflowing.

Further, the other side of the seating area is provided with a spacer protruding forward so that the display unit is seated with a proper height on the case and an interval for stably maintaining a seated state of the display unit is supported.

As a result, an area in which all of the groove, the bonding/waterproofing member, and the spacer are disposed should be secured in the seating area of the case and this is disadvantageous in terms of minimization of the bezel.

DETAILED DESCRIPTION OF THE DISCLOSURE

Technical Problems

An object of the present disclosure is to solve the above-described problem of increasing the bezel of the mobile terminal.

Technical Solutions

According to an aspect of the present disclosure, provided herein is a mobile terminal, including a display panel, a window coupled to a front surface of the display panel to cover the front surface of the display panel, and a seating frame in which the display panel is installed, wherein the seating frame includes a panel seating portion on which at least one area of the display panel is seated, a window seating portion on which a rear outer area of the window is seated, the window seating portion forming a larger separation space from a rear surface of the window in a direction of a horizontal inner side, and a sidewall portion configured to form a sidewall coupling the window seating portion and the panel seating portion and recessed towards a horizontal outer side with respect to an area corresponding to a side surface of the display panel.

According to another aspect of the present disclosure, the seating frame may form at least a part of the front surface or side surface of an outer appearance of the mobile terminal.

According to another aspect of the present disclosure, the mobile terminal may further include a support member provided in a rear outer area of the display panel, for supporting the panel seating portion.

According to another aspect of the present disclosure, the mobile terminal may further include a bonding member provided along a circumference between a rear outer area of the window and the window seating portion.

According to another aspect of the present disclosure, the bonding member may be provided with a horizontal width of 0.4 mm.

According to another aspect of the present disclosure, the seating frame may further include a boundary portion formed along an outer circumference of the window seating frame to correspond to a side area of the window and to form the same surface as a front area of the window.

According to another aspect of the present disclosure, the window seating portion may be provided along an outer circumference of the window to form a closed loop.

According to another aspect of the present disclosure, the window seating portion may include a seating surface facing a rear surface of the window and the seating surface may form an inclination of a specific angle with the rear surface of the window.

According to another aspect of the present disclosure, the seating surface and the rear surface of the window may form an inclination of 3°.

According to another aspect of the present disclosure, the window seating portion and the sidewall portion may be formed by numerical control (NC) work.

Advantageous Effects

The effects of a mobile terminal according to the present disclosure are as follows.

According to at least one of embodiments of the present disclosure, a bezel of the mobile terminal may be minimized.

According to at least one of embodiments of the present disclosure, a bonding member may be prevented from protruding from an outer side of the mobile terminal.

According to at least one of embodiments of the present disclosure, a probability of damaging a display unit is reduced as a bonding member flows to an inner side of the mobile terminal.

Additional range of applicability of the present disclosure will be apparent from the detailed description given below. However, it will be appreciated by those skilled in the art that various changes and modifications may be made thereto without departing from the scope and spirit of the present disclosure, and it should be also appreciated that the above-described embodiments are given merely as an example.

BEST MODE FOR CARRYING OUT THE DISCLOSURE

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are given in consideration of only facilitation of description and do not have particular meanings or functions. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present invention.

Optical devices described in the present specification may include a cellular phone, a smartphone, a laptop computer, a digital broadcast terminal, a personal digital assistant (PDA), a portable multimedia player (PMP), a navigation system, a slate personal computer (PC), a tablet PC, an ultrabook, or a wearable device (e.g., a smartwatch or a smartglasses), and a head-mounted display (HMD).

However, it will be easily appreciated by those skilled in the art that construction according to an embodiment disclosed in the present specification may be applied even to fixed terminals such as a digital TV, a desktop computer, and digital signage, except for the case in which the construction is applicable only to the optical devices.

Figure 1A:
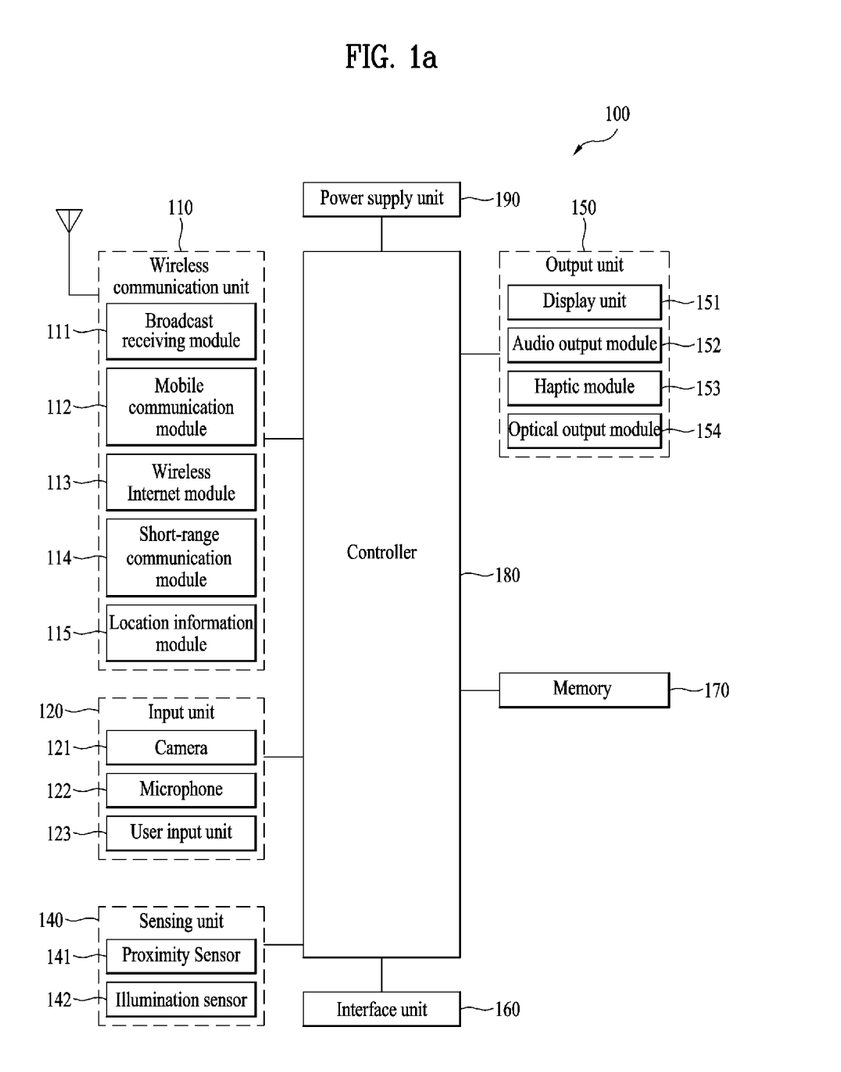
FIG. 1a is a block diagram of a mobile terminal related to the present disclosure.
Figure 1B:
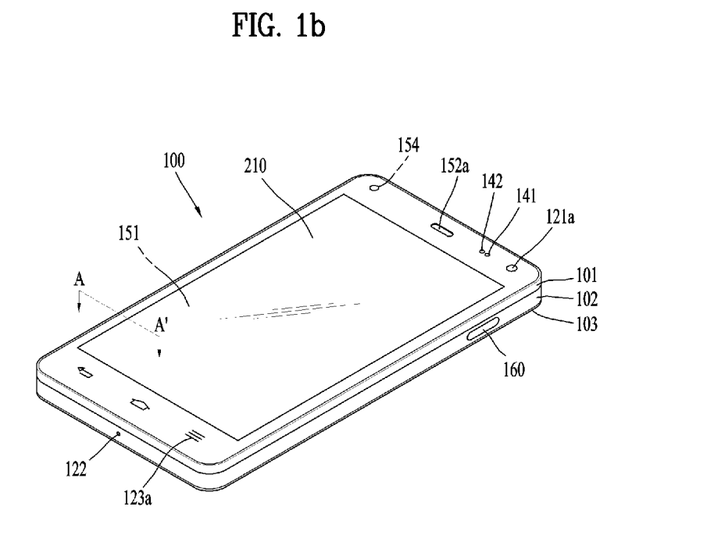
FIGS. 1b and 1c are conceptual diagrams illustrating an example of a mobile terminal related to the present disclosure when viewed in different directions.
Figure 1C:
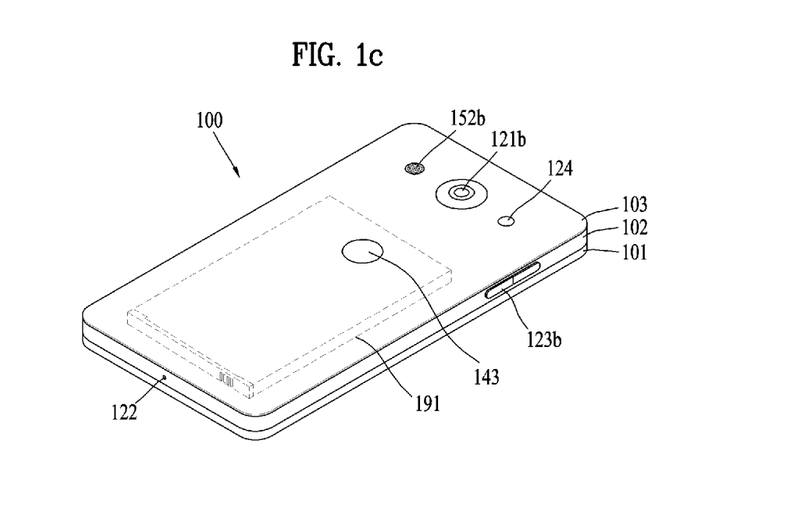

Referring to FIGS. 1a to 1c, FIG. 1a is a block diagram of a mobile terminal related to the present disclosure and FIGS. 1b and 1c are conceptual diagrams illustrating an example of a mobile terminal related to the present disclosure when viewed in different directions.

A mobile terminal 100 may include a wireless communication unit 110, an input unit 120, a sensing unit 140, an output unit 150, an interface unit 160, a memory 170, a controller 180, and a power supply unit 190. The components illustrated in FIG. 1a are not always essential components in implementing the mobile terminal 100 and the mobile terminal 100 described in the present specification may include more or fewer components than the components listed above.

More specifically, among the components, the wireless communication unit 110 may include one or more modules that enable wireless communication between the mobile terminal 100 and a wireless communication system, between the mobile terminal 100 and another mobile terminal, or between the mobile terminal 100 and an external server. In addition, the wireless communication unit 110 may include one or more modules that connect the mobile terminal 100 to one or more networks.

The wireless communication unit 110 may include at least one of a broadcast reception module 111, a mobile communication module 112, a wireless Internet module 113, a short-range communication module 114, and a location information module 115.

The input unit 120 may include a camera 121 or an image input unit for receiving an input image signal, a microphone 122 or an audio input unit for receiving an input audio signal, and a user input unit 123 (e.g., a touch key, a push key, a mechanical key, etc.) for receiving information from a user. Audio data or image data collected by the input unit 120 may be analyzed and processed as a control command of a user.

The sensing unit 140 may include one or more sensors for sensing at least one of internal information of the mobile terminal 100, surrounding environment information of the mobile terminal 100, or user information. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, an RGB sensor, an infrared (IR) sensor, a finger scan sensor, an ultrasonic sensor, an optical sensor (e.g., the camera 121), a microphone (e.g., the microphone 122), a battery gauge, an environment sensor (e.g., a barometer, a hygrometer, a thermometer, a radiation detection sensor, a thermal sensor, a gas sensor, etc.), and a chemical sensor (e.g., an electronic nose, a health care sensor, a biometric sensor, etc.). The mobile terminal 100 disclosed in this specification may combine and utilize information obtained from at least two of such sensors.

The output unit 150 is configured to generate audio, video, or tactile output. The output unit 150 may include at least one of a display unit 151, an audio output module 152, a haptic module 153, or an optical output module 154. The display unit 151 may have an inter-layered structure or an integrated structure with a touch sensor to implement a touchscreen. The touchscreen may provide an output interface between the mobile terminal 100 and a user, as well as function as the user input unit 123 which provides an input interface between the mobile terminal 100 and the user.

The interface 160 serves as an interface with various types of external devices that are connected to the mobile terminal 100. The interface 160 may include at least one of a wired/wireless headset port, an external power supply port, a wired/wireless data port, a memory card port, a port for connecting a device having an identification module, an audio input/output (I/O) port, a video I/O port, or an earphone port. The mobile terminal 100 may perform appropriate control functions associated with a connected external device, in response to the external device being connected to the interface 160.

The memory 170 stores data supporting various functions of the mobile terminal 100. The memory 170 may store a plurality of application programs or applications executed in the mobile terminal 100, and data or instructions for operations of the mobile terminal 100. At least some of these application programs may be downloaded from an external server via wireless communication. At least some of the application programs may be installed within the mobile terminal 100 at time of manufacture or shipping, for basic functions of the mobile terminal 100 (e.g., receiving a call, placing a call, receiving a message, sending a message, etc.). The application programs may be stored in the memory 170, installed in the mobile terminal 100, and executed by the controller 180 to perform an operation (or function) of the mobile terminal 100.

The controller 180 typically functions to control overall operation of the mobile terminal 100, in addition to the operations associated with the application programs. The controller 180 may provide or process appropriate information or functions for a user by processing signals, data, information, etc., which are input or output by the above-described components, or executing application programs stored in the memory 170.

In addition, the controller 180 may control at least some of the components illustrated in FIG. 1a, for execution of the application programs stored in the memory 170. Further, the controller 180 may operate a combination of at least two of the components included in the mobile terminal 100, for execution of the application programs.

The power supply 190 receives external power or internal power to supply power to the components included in the mobile terminal 100, under control of the controller 180. The power supply 190 may include a battery, and the battery may be may be a built-in battery or a replaceable battery.

At least some of the components may operate in cooperation with each other in order to implement the method of operating or controlling the mobile terminal 100 according to below-described various embodiments. In addition, the method of operating or controlling the mobile terminal 100 may be implemented in the mobile terminal 100 by executing at least one application program stored in the memory 170.

Referring to FIGS. 1b and 1c, the mobile terminal 100 includes a bar-type terminal body. However, the mobile terminal 100 is not limited to the bar type and may be applied to a variety of types, such as a watch type, a clip type, a glasses type, and a folder type, a flip type, a slide type, a swing type, and a swivel type in which two and more bodies are combined with each other in a relatively movable manner. Discussion herein will relate to a particular type of mobile terminal. However, such description with regard to a particular type of mobile terminal may be generally applied to other types of mobile terminals as well.

The terminal body herein may refer to the mobile terminal 100 as at least one assembly.

The mobile terminal 100 includes a case (e.g., a frame, a housing, a cover, etc.) forming the appearance thereof. As illustrated, the mobile terminal 100 includes a front case 101 and a rear case 102. Various electronic components are incorporated into a space formed between the front case 101 and the rear case 102. At least one middle case may be additionally positioned between the front case 101 and the rear case 102.

A display unit 151 may be located on the front side of the terminal body to output information. As illustrated, a window 210 of the display unit 151 may be mounted on the front case 101 to form the front surface of the terminal body together with the front case 101.

In some cases, electronic components may also be mounted in the rear case 102. Examples of such electronic components mounted on the rear case 102 include a detachable battery, an identification module, a memory card, and the like. A rear cover 103 covering the electronic components mounted on the rear case 102 may be detachably coupled to the rear case 102. Therefore, when the rear cover 103 is detached from the rear case 102, the electronic components mounted on the rear case 102 are externally exposed.

As illustrated, when the rear cover 103 is coupled to the rear case 102, a side surface of the rear case 102 may be partially exposed. In some cases, upon coupling, the rear case 102 may also be completely shielded by the rear cover 103. The rear cover 103 may include an opening for externally exposing a camera 121b or an audio output module 152b.

The cases 101, 102, and 103 may be formed by injection-molding a synthetic resin or may be formed of a metal, for example, stainless steel (STS), aluminum (Al), titanium (Ti), or the like.

As an alternative to the example in which the plurality of cases provides an inner space for accommodating various electronic components, one case may be configured to provide the inner space. In this case, the mobile terminal 100 having a unified body may be formed in such a manner that synthetic resin or metal extends from a side surface to a rear surface.

The mobile terminal 100 may include a waterproofing unit (not shown) for preventing introduction of water into the terminal body. For example, the waterproofing unit may include a waterproofing member which is located between the window 210 and the front case 101, between the front case 101 and the rear case 102, or between the rear case 102 and the rear cover 103, to seal an inner space when those components are coupled.

The mobile terminal 100 may include the display unit 151, first and second audio output modules 152a and 152b, a proximity sensor 141, an illumination sensor 142, an optical output module 154, first and second cameras 121a and 121b, first and second manipulation units 123a and 123b, a microphone 122, and an interface 160.

The mobile terminal 100 will now be described in which the display unit 151, the first audio output module 152a, the proximity sensor 141, the illumination sensor 142, the optical output module 154, the first camera 121a, and the first manipulation unit 123a are arranged on a front surface of the terminal body, the second manipulation unit 123b, the microphone 122, and the interface 160 are arranged on a side surface of the terminal body, and the second audio output modules 152b and the second camera 121b are arranged on a rear surface of the terminal body, as illustrated in FIGS. 1b and 1c.

However, alternative arrangements are possible without being limited to the above configuration. Some components may be omitted, replaced, or rearranged, when necessary. For example, the first manipulation unit 123a may not be located on the front surface of the terminal body, and the second audio output module 152b may be located not on the rear surface of the terminal body but on the side surface of the terminal body.

The display unit 151 displays (outputs) information processed in the mobile terminal 100. For example, the display unit 151 may display execution screen information of an application program executed in the mobile terminal 100 or user interface (UI) or graphical user interface (GUI) information according to such execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, or an e-ink display.

Two or more display units 151 may be present according to an implementation type of the mobile terminal 100. In this case, a plurality of display units may be arranged on one surface of the mobile terminal 100 or may be spaced apart from each other or integrated, or these display units may be arranged on different surfaces of the mobile terminal 100.

The display unit 151 may include a touch sensor which senses touch input received at the display unit 151 so as to receive a control command in a touching manner. When touch is input to the display unit 151, the touch sensor may be configured to sense this touch and the controller 180 generates a control command corresponding to the touch. The content which is input in the touching manner may be text or numbers, or a menu item which is capable of being indicated or designated in various modes.

The touch sensor may be configured in the form of a film having a touch pattern such that the touch sensor may be disposed between the window 210 and a display (not shown) on a rear surface of the window 210 or may be a metal wire which is patterned directly on the rear surface of the window 210. Alternatively, the touch sensor may be integrally formed with the display. For example, the touch sensor may be disposed on a substrate of the display or within the display.

The display unit 151 may also form a touchscreen together with the touch sensor. Here, the touchscreen may serve as the user input unit (123, see FIG. 1a). In some cases, the touchscreen may replace at least some of functions of the first manipulation unit 123a.

The first audio output module 152a may be implemented in the form of a receiver to deliver telephone conversation to ears of a user or in the form of a loudspeaker to output various alarm sounds or multimedia audio reproduction sounds.

The window 210 of the display unit 151 may include an audio hole to allow sound generated by the first audio output module 152a to pass therethrough. However, the present disclosure is not limited thereto and sound may be released along an assembly gap between structural bodies (e.g., a gap between the window 210 and the front case 101). In this case, a hole independently formed to output sound may not be visible or is otherwise hidden, thereby further simplifying the appearance of the mobile terminal 100.

The optical output module 154 is configured to output light for indicating occurrence of an event. Examples of the event include message reception, call signal reception, a missed call, an alarm, a schedule notice, email reception, and information reception through an application. When it is sensed that a user has checked the event, the controller 180 may control the optical output unit 154 to stop output of light.

The first camera 121a processes a video frame of a still or moving image obtained by an image sensor in a capture mode or a video call mode. The processed video frame may be displayed on the display unit 151 and may be stored in the memory 170.

The first and second manipulation units 123a and 123b are examples of the user input unit 123 which is manipulated in order to receive a command for controlling operation of the mobile terminal 100 and may be commonly referred to as a manipulation portion. The first and second manipulation units 123a and 123b may employ any tactile manner that allows the user to perform manipulation such as touch, push, or scroll. The first and second manipulation units 123a and 123b may also employ any non-tactile manner that allows the user to perform manipulation such as proximity touch or hovering touch.

Although the first manipulation unit 123a is a touch key in this figure, the present disclosure is not limited thereto. For example, the first manipulation unit 123a may include a push key (mechanical key) or a combination of a touch key and a push key.

Input received at the first and second manipulation units 123a and 123b may be configured in various ways. For example, the first manipulation unit 123a may receive a command such as a menu, a home key, cancel, or search and the second manipulation unit 123b may receive a command for controlling a volume level output from the first or second audio output module 152a or 152b or for switching to a touch recognition mode of the display unit 151.

As another example of the user input unit 123, a rear input unit (not shown) may be located on the rear surface of the terminal body. The rear input unit may be manipulated to receive a command for controlling operation of the mobile terminal 100. The received command may be configured in a variety of ways. For example, a command such as power on/off, start, end, or scroll, a command for controlling a volume level output from the first or second audio output modules 152a or 152b, or a command for switching to a touch recognition mode of the display unit 151 may be received. The rear input unit may be configured to permit touch input, push input, or combinations thereof.

The rear input unit may be located to overlap the display unit 151 of the front surface in a thickness direction of the terminal body. As an example, the rear input unit may be located on an upper end portion of the rear surface of the terminal body such that a user may easily manipulate the rear input unit using a forefinger when the user grabs the terminal body with one hand. However, the present disclosure is not limited thereto and the position of the rear input unit may be changed.

If the rear input unit is provided on the rear surface of the terminal body, a new user interface using the rear input unit may be implemented. In addition, the above-described touchscreen or the rear input unit may replace at least some of functions of the first manipulation unit 123a located on the front surface of the terminal body. As such, if the first manipulation unit 123a is not located on the front surface of the terminal body, the display unit 151 may be configured to have a larger screen.

The mobile terminal 100 may include a finger scan sensor which scans a fingerprint of a user. The controller 180 may use fingerprint information sensed by the finger scan sensor as an authentication means. The finger scan sensor may be installed in the display unit 151 or the user input unit 123.

The microphone 122 is configured to receive voice of a user or other sounds. The microphone 122 may be provided at a plurality of places to receive stereoscopic sound.

The interface 160 may serve as an interface between the mobile terminal 100 and an external device. For example, the interface 160 may be at least one of a connection terminal for connecting to another device (e.g., an earphone or an external speaker), a port for near-field communication (e.g., an Infrared Data Association (IrDA) port, a Bluetooth port, or a wireless LAN port), or a power supply terminal for supplying power to the mobile terminal 100. The interface 160 may be implemented in the form of a socket for accommodating an external card, such as a Subscriber Identity Module (SIM), a User Identity Module (UIM), or a memory card for information storage.

The second camera 121b may be disposed on the rear surface of the terminal body. The second camera 121b includes an image capturing direction that is substantially opposite to an image capture direction of the first camera unit 121a.

The second camera 121b may include a plurality of lenses arranged along at least one line. The plurality of lenses may also be arranged in a matrix. The cameras may be referred to as an "array camera". When the second camera 121b is implemented as the array camera, images may be captured in various manners using the plurality of lenses and images with better quality may be acquired.

A flash 124 may be provided adjacent to the second camera 121b. When an image of a subject is captured with the camera 121b, the flash 124 may illuminate the subject.

The second audio output module 152b may be additionally located on the terminal body. The second audio output module 152b may implement stereophonic sound functions in conjunction with the first audio output module 152a and may also be used to implement a speakerphone mode for a phone call.

The terminal body may be provided with at least one antenna for wireless communication. The antenna may be installed in the terminal body or may be formed in the case. For example, an antenna which constitutes a part of the broadcast reception module (111, see FIG. 1a) may be configured to be extendable from the terminal body. Alternatively, the antenna may be formed in a film shape to be attached to an inner surface of the rear cover 103 or a case including a conductive material may function as the antenna.

The terminal body is provided with the power supply (190; see FIG. 1a) for supplying power to the mobile terminal 100. The power supply 190 may include a battery 191 which is mounted in the terminal body or detachably coupled to the outside of the terminal body.

The battery 191 may be configured to receive power via a power source cable connected to the interface 160. The battery 191 may be recharged in a wireless manner using a wireless charger. Wireless charging may be implemented by magnetic induction or resonance (magnetic resonance).

The rear cover 103 is coupled to the rear case 102 to cover the battery 191, to prevent separation of the battery 191 and to protect the battery 191 from external impact or foreign materials. When the battery 191 is detachable from the terminal body, the rear cover 103 may be detachably coupled to the rear case 102.

Figure 2:
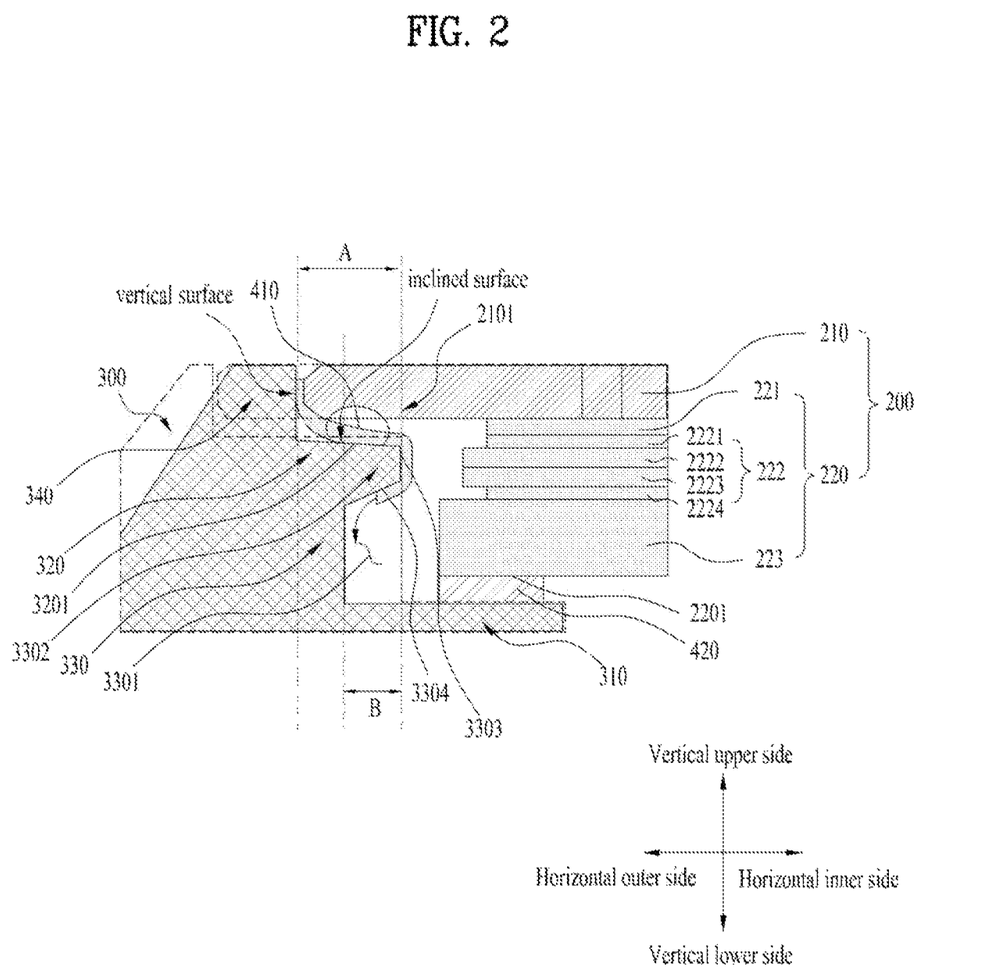
FIG. 2 is a conceptual cross-sectional view taken along line A-A' of FIG. 1b.

FIG. 2 is a conceptual cross-sectional view taken along line A-A' of FIG. 1b.

The above-described display unit refers to a display assembly 200 including a window 210 and a display panel 220.

The display panel 220 indicates a set of components configured in a stacked manner in order to output images. The display panel 220 may be provided as various types such as a Liquid Crystal Display (LCD) type, an Organic Light-Emitting Diode (OLED) type, and a micro Light-Emitting Diode (LED) type.

For example, the display panel 220 of the LCD type may include a liquid crystal panel 222 and a backlight unit 223. The liquid crystal panel 222 may include an upper polaroid film, 2221, a color filter layer 2222, a Thin-Film Transistor (TFT) layer, 2223, and a lower polaroid film 2224.

Although the display panel 220 of the LCD type is illustrated in FIG. 2, features of the present disclosure are not always limited thereto. Therefore, features applied to the display panel 220 of the LCD type described below are applicable even to the display panel 220 of the OLED type or the display panel 220 of the micro LED type.

The window is disposed on a front surface of the display panel 220.

Although the display panel 220 may maintain a contact state with the window 210 without being fixed to the window 210, it is a recent general trend to combine the display panel 220 and the window 210 by attaching the display panel 220 to the window 210. For the display assembly 200 of an integral type, the display panel 220 may include an Optically Clear Adhesive (OCA) film 221 so as to be fixed to the window 210.

The window 210 covers the front surface of the display panel 220. That is, the region of the window 210 is formed to be larger than the region of the display panel 220, so that the window 210 not only protects the display panel 220 but also provides a counterpart area for a bonding area between the display assembly 200 and a seating frame 300.

The seating frame 300 refers to a member for supporting at least one area of a rear surface of the display assembly 200 and seating the display assembly 200 thereon by surrounding a side surface of the display assembly 200.

The seating frame 300 may be the front case (101, see FIG. 1) or the middle case described with reference to FIG. 1. In the features of the present disclosure, the distinction between the two cases is meaningless and thus the seating frame 300 is not limited to a specific member.

The seating frame 300 may largely include a panel seating portion 310, a window seating portion 320, and a sidewall portion 330.

The panel seating portion 310 forms an area in which the display panel 220 is seated.

The window seating portion 320 refers to an area in which the window 210 is seated and to which the window is coupled. An outer rear area of the window 210 that does not correspond to the area of the panel is coupled to the window seating portion 320.

The sidewall portion 330 forms a sidewall connecting the panel seating portion 310 and the window seating portion 320 and covers a side area of the display panel 220.

A rear outer area 2101 of the window 210 is seated on the window seating portion 320. The window seating portion 320 is provided with a bonding member 410 to couple the window 210 and the seating frame 300. If necessary, the bonding member 410 may be provided with a material and shape having a waterproof function. In order to implement waterproof performance, the bonding member 410 may be provided along the circumference of the window seating portion 320 to form a closed curve.

The bonding member 410 is desirably provided with a horizontal width of 0.4 mm as measured along the periphery of the window seating portion 320. A thinner horizontal width of the bonding member 410 is favorable to reduction of the bezel. However, if the bonding member 410 is provided with an excessively thin width, adhesion or waterproof performance may not be sufficiently implemented.

A seating surface 3201 of the window seating portion 320 refers to a surface facing a rear surface of the window 210. The seating surface 3201 may form a larger separation space from the rear surface of the window 210 in a direction of a horizontal inner side. That is, a vertical distance from one point of the seating surface 3201 to the rear surface of the window 210 may be increased in a direction of the horizontal inner side.

This serves to prevent the bonding member 410 from spreading towards a horizontal outer side and then protruding between the window 210 and the seating frame 300 since the bonding member 410 is compressed and then spread when the window 210 is seated on and coupled to the window seating portion 320 to which the bonding member 410 is applied. This may replace the conventional groove described above.

In particular, the seating surface 3201 of the window seating portion 320 may be inclined to form a specific angle with the rear surface of the window 210, based on one vertical section of the mobile terminal 100. In this case, it is desirable that the seating surface 3201 of the window seating portion 320 and the rear surface of the window 210 form an inclination of about 3°.

When the bonding member 410 spreads towards the horizontal inner side in a coupling process of the window 210 and the window seating portion 320, the bonding member 410 may flow downwards along the sidewall portion 330. In this case, there is a risk that the bonding member 410 contacts the display panel 220. When the bonding member 410 contacts the display panel 220, the display panel 220 may malfunction.

To prevent this, the sidewall portion 330 may form a recessed area 3301, that is recessed towards a horizontal outer side, in an area corresponding to the side surface of the display panel 220. The horizontal distance between the sidewall portion 330 and the display panel 220 becomes more than a certain distance due to the recessed area 3301 of the sidewall portion 330. Accordingly, even when the bonding member 410 flows downwards to the sidewall portion 330, the possibility that the bonding member 410 contacts the display panel 220 is significantly reduced.

Due to the recessed area 3301, an upper end of the sidewall portion 330 may form a bump 3302 that relatively protrudes in a direction of a horizontal inner side of the mobile terminal 100.

The bump 3302 of the sidewall portion 330 may form a vertical area 3303 starting at the end of the seating surface 3201 of the window seating portion 320 and a reverse-inclined surface 3304 starting to form the recessed area 3301 at the end of the vertical area 3303. The reverse-inclined surface 3304 forms not a horizontal direction but an inclination so that, while the bonding member 410 flows along the vertical area 3303, the bonding member 410 is guided to naturally flow to the recessed area 3301 along the reverse-inclined surface 3304 without flowing to a vertical lower side.

A vertical depth B of the recessed area 3301, which means a length from one end of the bump 3302 to a recessed surface of the recessed area 3301, is appropriately about 0.2 to 0.6 mm as illustrated in FIG. 2.

Figure 3:
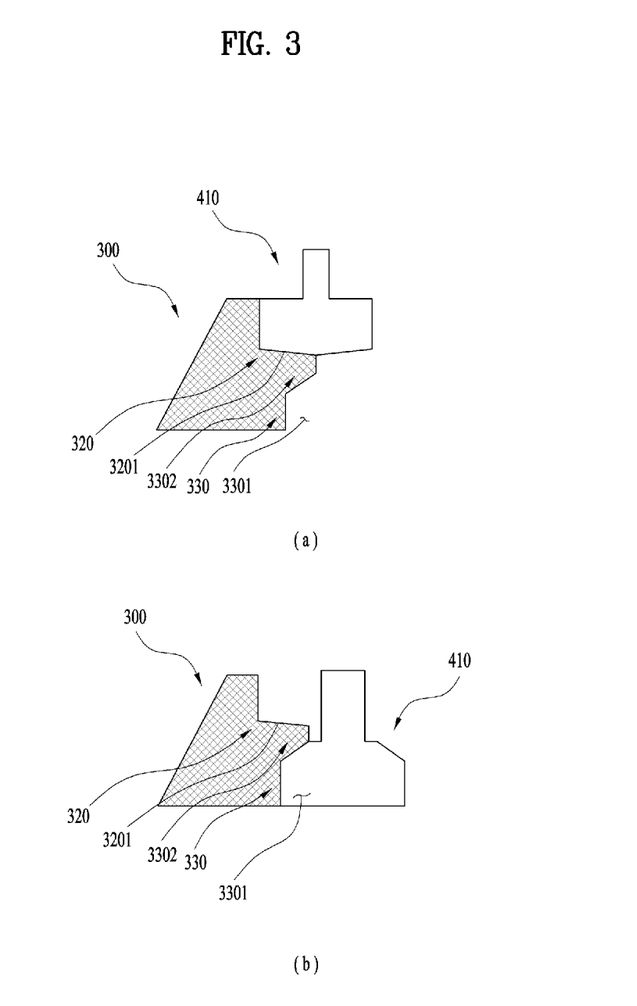
FIG. 3 is a conceptual cross-sectional view taken along line A-A' of FIG. 1b.

FIG. 3 is a conceptual cross-sectional view taken along line A-A' of FIG. 1b.

The seating frame 300 may be implemented by Numerical Control (NC) work. FIG. 3(a) illustrates a first cutting member for cutting an area around the window seat 320, and FIG. 3(b) illustrates a second cutting member for cutting an area around the sidewall portion 330. The first cutting member may form the seating surface 3201 and the second cutting member may form the reverse-inclined surface 3304. Work of the second cutting member may be performed after work of the first cutting member is performed or, conversely, work of the first cutting member may be performed after work of the second cutting member is performed.

Referring back to FIG. 2, a support member 420 for supporting the panel seating portion 310 may be provided on the rear surface of the display panel 220. In particular, the support member 420 may be disposed in a rear outer area 2201 of the rear surface of the display panel 220.

The support member 420 serves to maintain a height so that the window 210 and the display panel 220 may be seated with a sufficient height on the seating frame 300. That is, the support member 420 prevents the window 210 from being excessively pressed against the window seating portion 320. When the window 210 is provided by being excessively pressed against the window seating portion 320, the bonding member 410 may be excessively compressed and may not sufficiently perform a bonding function or a waterproof function and front edges of the seating frame 300 and the window 210 may be formed not to match.

Conventionally, a protrusion portion of the above-described window seating portion 320 has performed this function. However, there is a disadvantage in that the width of the window seating portion 320 is increased in order to provide the protrusion portion so that the bezel is increased. The support member 420 of the present disclosure helps to reduce the bezel by preventing this problem.

The support member 420 may be attached and fixed to at least one surface of the display panel 220 or the seating frame 300 or may be positioned without attachment if necessary.

The support member 420 is provided with a cushioning material such as a pad or a rubber to maintain the height of the display assembly 200 and, at the same time, minimize the probability that the display assembly 200 is damaged by impact.

FIG. 4(a) illustrates the rear surface of the conventional display assembly 200 and FIG. 4(b) illustrates the rear surface of the display assembly 200 of the present disclosure.

Figure 4:
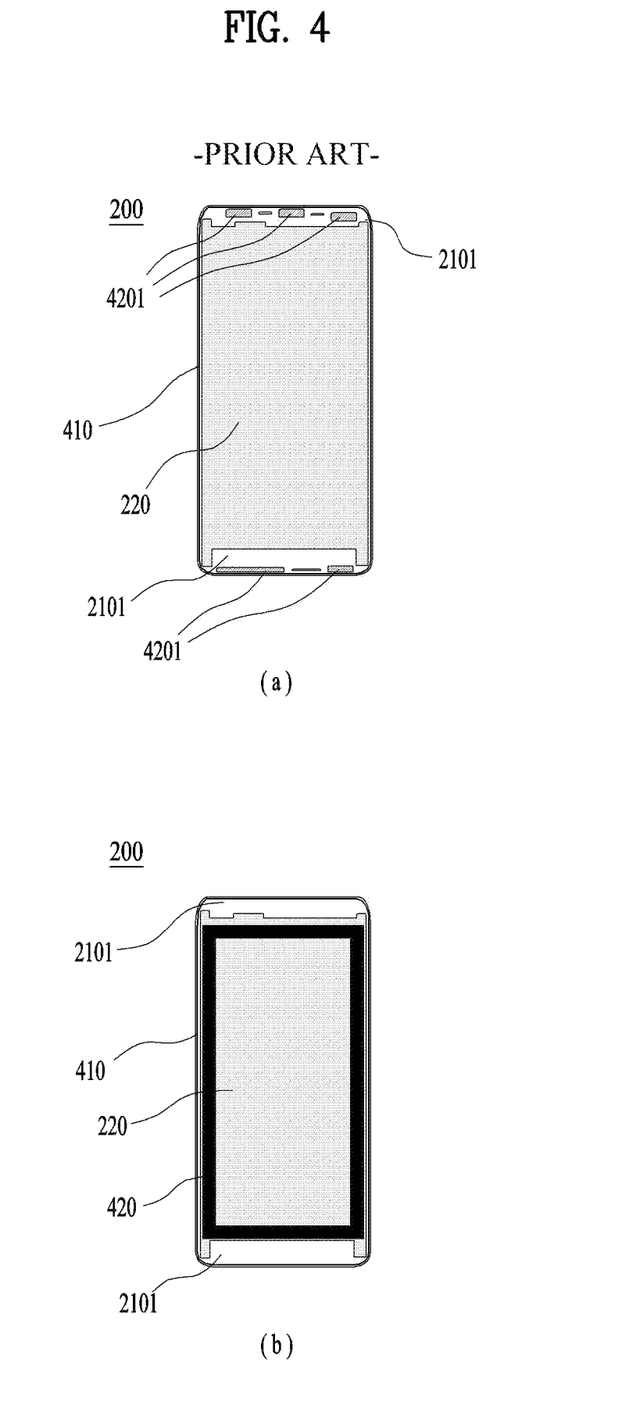
FIG. 4(a) illustrates the rear surface of a conventional display assembly and FIG. 4(b) illustrates the rear surface of a display assembly of the present disclosure.

The bonding member 410 and the support member 420 shown in FIG. 4 show relative positions with respect to the display assembly 200 and are not actually coupled to the display assembly 200.

While a bezel space for the provision of protrusion portions 4201 should be secured as shown in FIG. 4(a), the support member 420 is provided on the rear surface of the display panel 220 in FIG. 4(b) and thus it is unnecessary to secure the bezel space.

In the case of FIG. 4(a), since the protrusion portions 4201 serving as the support member 420 of the present disclosure are provided on the window seating portion 320, the protrusion portions 4201 should be provided in a minimum area to prevent an increase in the bezel. Accordingly, as shown in FIG. 4A, the protrusion portions 4201 may be limitedly provided on the upper and lower sides of the mobile terminal 100.

On the other hand, since the support member 420 of the present disclosure is provided on the rear surface of the display panel 220 as shown in FIG. 4(b), the arrangement and length of the support member 420 may be freely configured. When the support member 420 is provided in the entire area along the rear circumference of the display panel 220, the support member 420 may stably support the window 210 and the display assembly 200, thereby increasing the completeness of the mobile terminal 100.

Alternatively, if necessary, the support member 420 may be supported in one area to a degree of supporting the display panel 220 and the window 210. For example, the support member 420 may be disposed at upper and lower ends of the rear surface of the display panel 220 or may be disposed at left and right ends of the rear surface of the display panel 220.

Referring back to FIG. 2, a boundary portion 340 of the seating frame 300 is formed along the outer circumference of the window seating portion 320. The boundary portion 340 is provided to protrude upward as compared with the window seating portion 320 and protects the side surface of the window 210 by surrounding the side area of the window 210 so as to correspond to the side area of the window 210.

In addition, the boundary portion 340 may form the same surface as the front area of the window 210 so as to cause a user to minimize feeling of a foreign object in the boundary between the window 210 and the seating frame 300.

Due to the application of the above features, a horizontal width A of the seating surface 3201 in the window seating portion 320 may be implemented with a horizontal width ranging from 0.6 to 0.65 mm as illustrated in FIG. 2.

Dotted lines in FIG. 2 represent a rough outline of a conventional seating frame and window. As shown, it may be appreciated that the seating surface to which the features of the present disclosure are applied may be narrower than the conventional seating surface.

Mode for Carrying Output the Disclosure

Those skilled in the art will appreciate that the present disclosure may be carried out in other specific ways than those set forth herein without departing from the spirit and essential characteristics of the present disclosure.

The above description is therefore to be construed in all aspects as illustrative and not restrictive. The scope of the disclosure should be determined by reasonable interpretation of the appended claims and all changes coming within the equivalency range of the disclosure are intended to be embraced in the scope of the disclosure.

INDUSTRIAL APPLICABILITY

The above-described features may be partially or entirely applied to a mobile terminal.

The invention claimed is:

1. A mobile terminal, comprising:
   a display panel;
   a window coupled an outer-facing upper horizontal surface of the display panel to cover the outer-facing upper horizontal surface of the display panel; and
   a seating frame in which the display panel is installed, wherein the seating frame includes
   a panel seating portion on which at least one area of the display panel is seated;
   a window seating portion including a vertical surface around a perimeter of the window on which an area of the window is seated and an inclined seating surface, wherein a vertical distance from the inclined seating surface to an inner-facing surface of the window is increased in a direction of the inner side;
   a bonding member provided along a perimeter between the window and the window seating portion and flowing between the window and the window seating portion into a volume recessed area; and
   a sidewall portion configured to form a sidewall between the window seating portion and the panel seating portion,
   wherein the volume recessed area is formed in a horizontal direction between the inner-side of the sidewall and the display panel, and in a vertical direction from the window to the inner-facing panel seating portion.

2. The mobile terminal of claim 1, wherein the seating frame forms at least a part of the outer-facing upper horizontal surface or side surface of an outer appearance of the mobile terminal.

3. The mobile terminal of claim 1, further comprising a support member provided in a rear outer area of the display panel, for supporting the panel seating portion.

4. The mobile terminal of claim 1, wherein the bonding member has a horizontal width of 0.4 mm.

5. The mobile terminal of claim 1, wherein the seating frame further comprises a boundary portion formed along an outer perimeter of the window seating frame to correspond to a side area of the window and to form the same surface as a front area of the window.

6. The mobile terminal of claim 1, wherein the window seating portion is provided along an outer perimeter of the window to form a closed loop.

7. The mobile terminal of claim 1, wherein the inclined seating surface and the rear surface of the window form an inclination of 3°.

8. The mobile terminal of claim 1, wherein the window seating portion and the sidewall portion are formed by numerical control (NC) work.

* * * * *